C. E. SEARS.
PORTABLE BAKER'S OVEN.
APPLICATION FILED APR. 29, 1909.
955,917.
Patented Apr. 26, 1910.
4 SHEETS—SHEET 3.
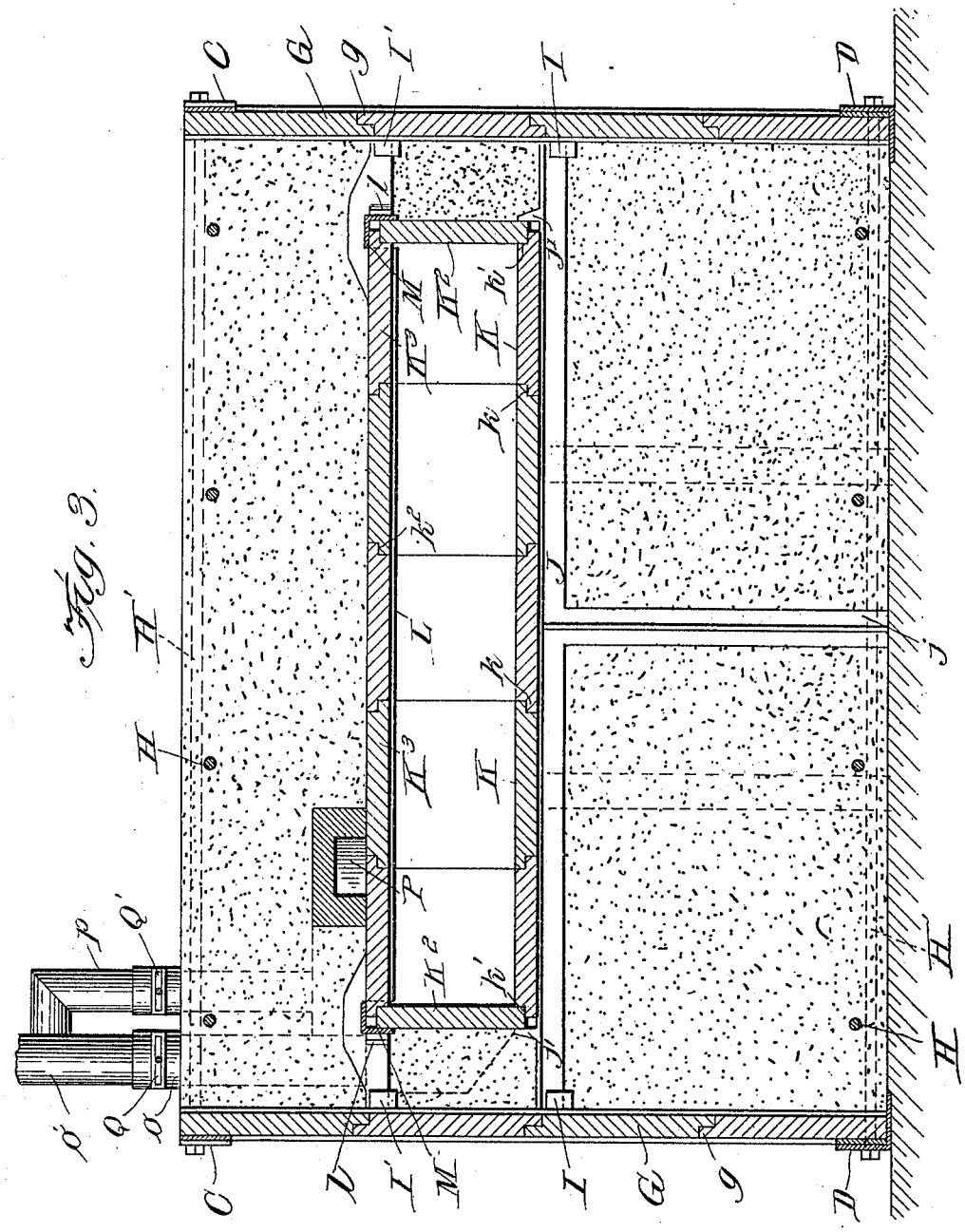
Witnesses:
Harry S. Gaither
Inventor:
Clarence E. Sears
By Chamberlin + Freudenreich
Attys

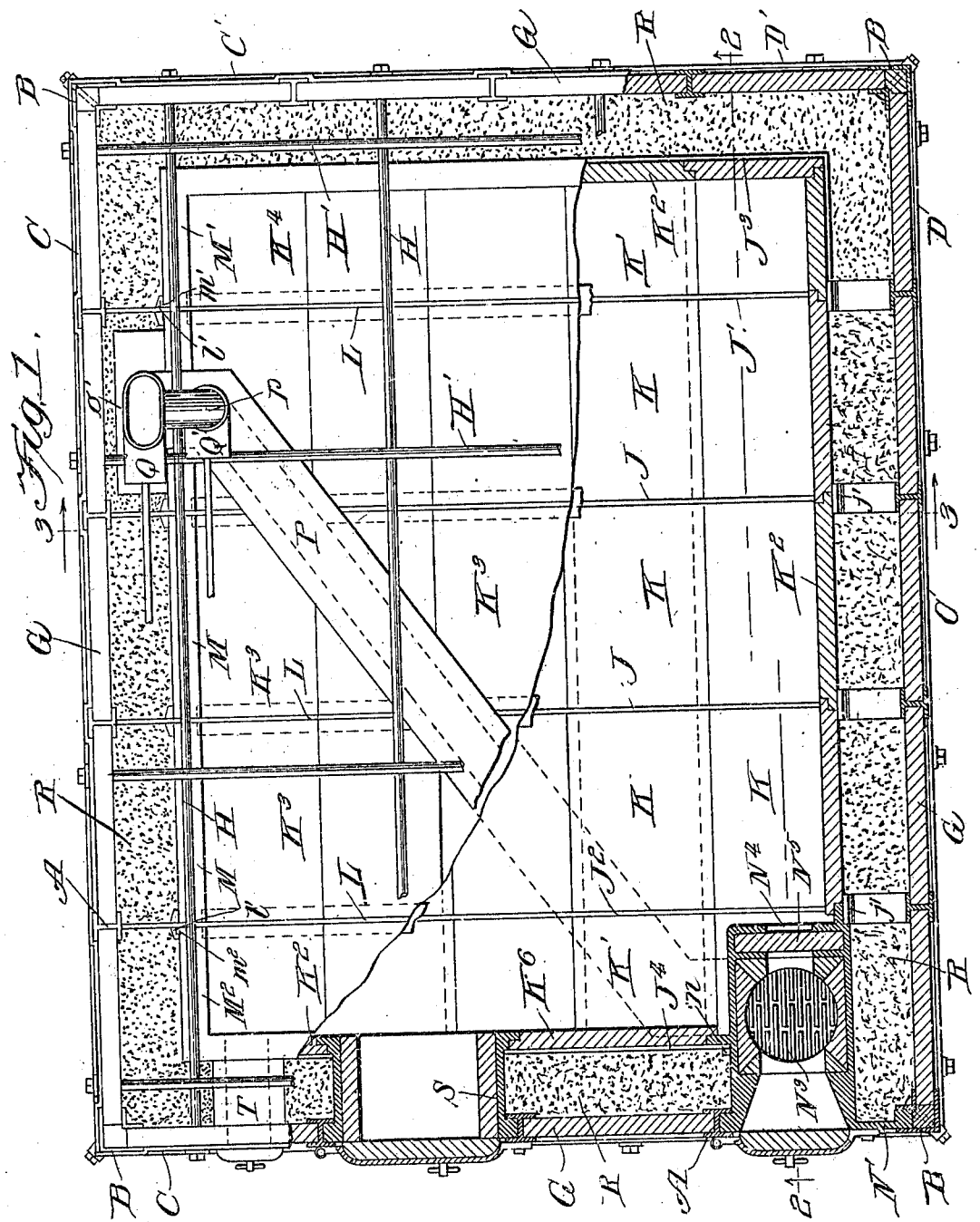

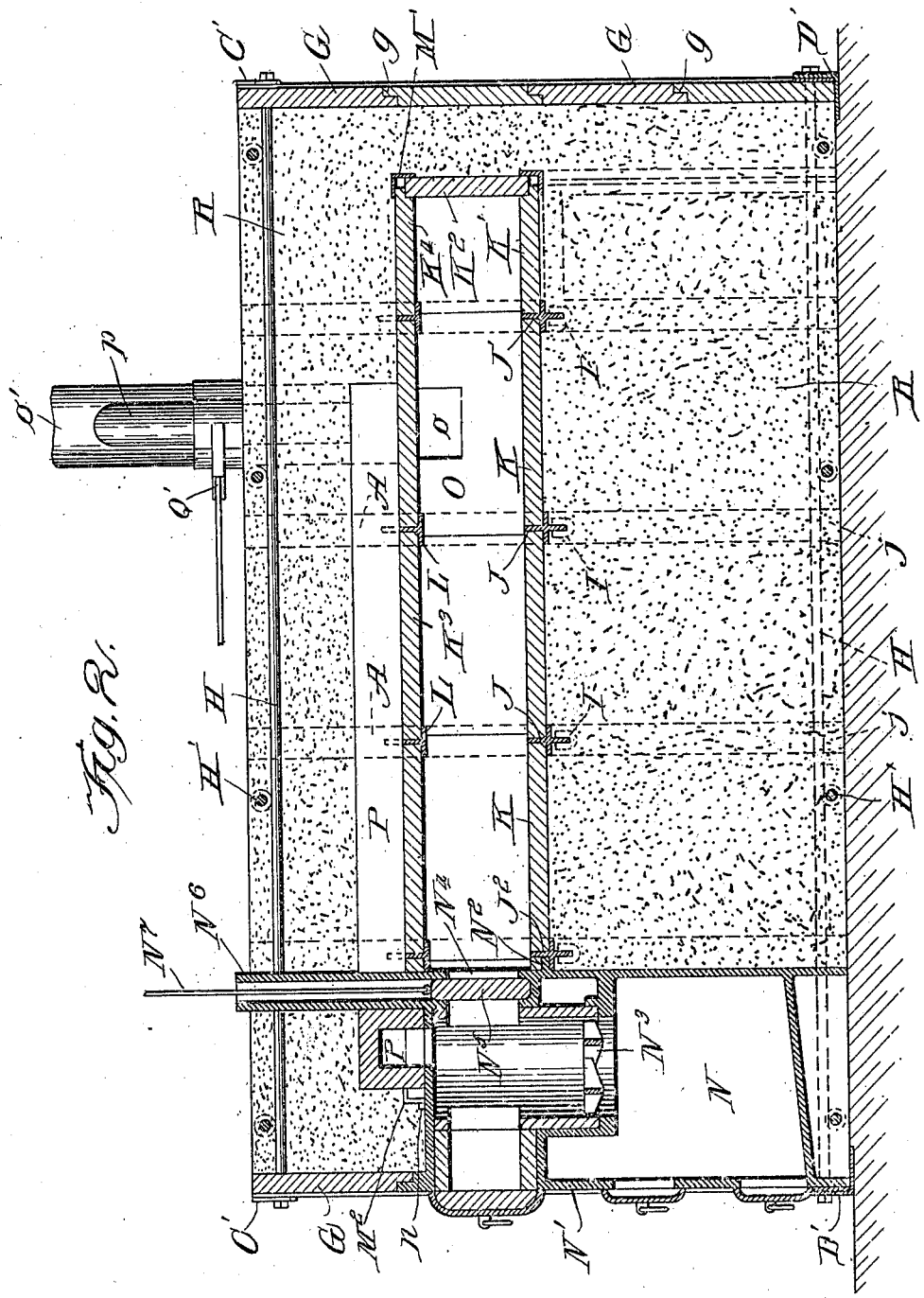

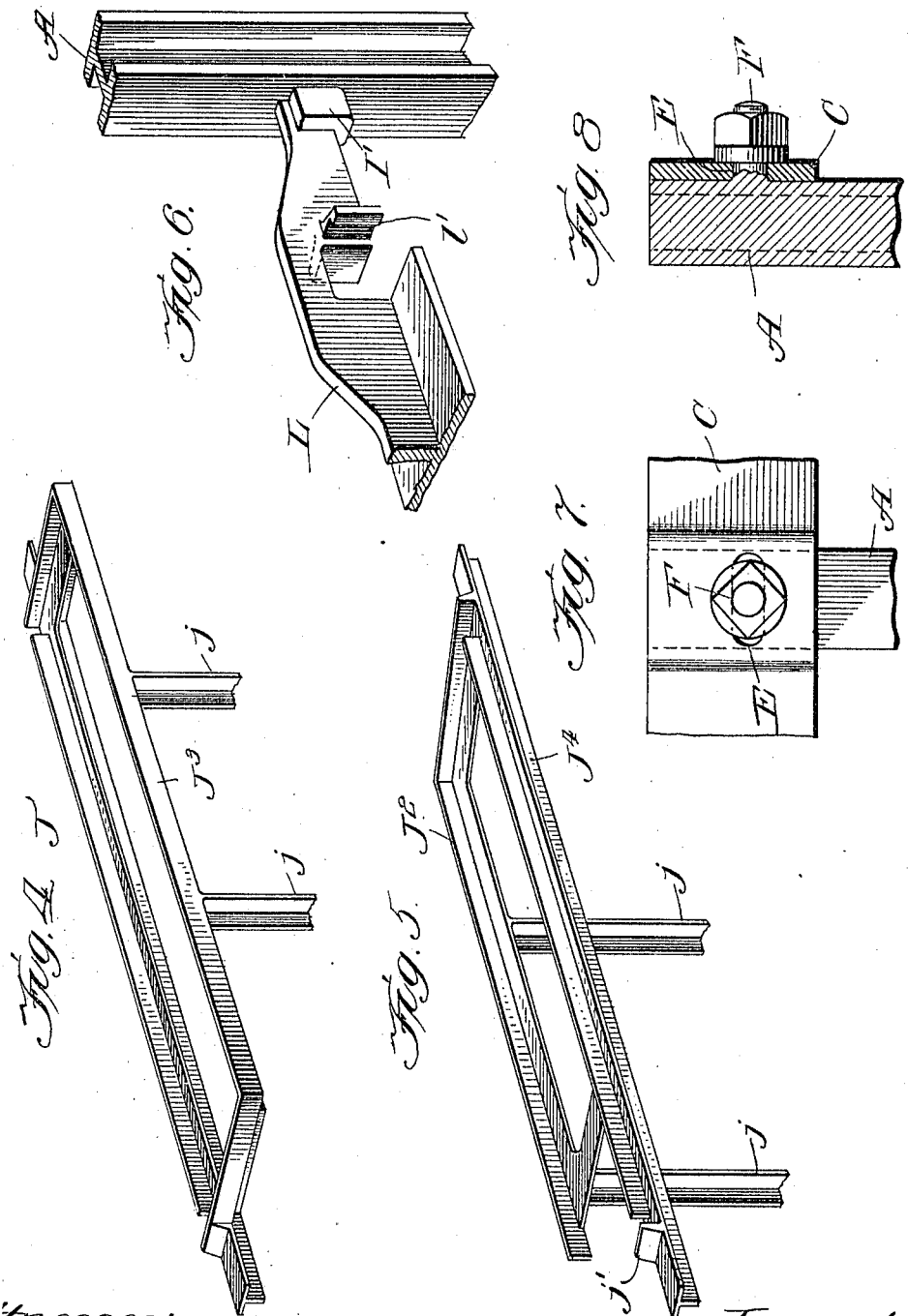

UNITED STATES PATENT OFFICE.

CLARENCE E. SEARS, OF CHICAGO, ILLINOIS, ASSIGNOR OF ONE-HALF TO JAMES E. PLEW, OF CHICAGO, ILLINOIS.

PORTABLE BAKER'S OVEN.

955,917.

Specification of Letters Patent.   Patented Apr. 26, 1910.

Application filed April 29, 1909.  Serial No. 492,818.

*To all whom it may concern:*

Be it known that I, CLARENCE E. SEARS, a citizen of the United States, residing at Chicago, county of Cook, State of Illinois, have invented a certain new and useful Improvement in Portable Bakers' Ovens, and declare the following to be a full, clear, and exact description of the same, such as will enable others skilled in the art to which it pertains to make and use the same, reference being had to the accompanying drawings, which form a part of this specification.

Bakers' ovens are quite costly and whenever it is necessary for a baker to move his business a considerable loss is incurred through inability to move the oven. In order to avoid the loss of an oven, the baker is often compelled to remain in his old place of business when he would much rather move.

One object of my invention is to provide an oven which is so constructed that it may be dismantled and again set up in a new location without impairing its value or efficiency.

A further object of my invention is to provide an oven composed of a few simple parts which may be set up quickly and conveniently.

In intermittently heated ovens there is a furnace which discharges its products of combustion directly into the baking compartment from which they are in turn conducted by means of a flue. The hot combustion gases heat the oven from the interior of the baking compartment and, when a sufficient degree of heat has been reached, the fire is drawn and the baking proceeds and continues until the temperature drops below the desired degree. In starting the fire there is always, of course, more or less volatile matter given off which is not consumed and, where this collects on the interior of the baking compartment, it forms soot or otherwise blackens the interior of the baking compartment so that it is necessary to clean the baking compartment frequently on this account. Furthermore, it is often desirable to continue the baking for a short time after the temperature of the oven has fallen to a degree below which it is not practicable to bake. If a fire is started in the furnace, however, more soot and smoke enters the baking compartment.

A further object of my invention is to provide a novel heating arrangement for bakers' ovens whereby blackening of the baking compartment is avoided and additional heat may at any time be supplied without disadvantageous results.

The various features of novelty whereby my invention is characterized will hereinafter be pointed out with particularity in the claims; but, for a full understanding of my invention and of its objects, including those above enumerated, and advantages, reference may be had to the following detailed description taken in connection with the accompanying drawings, wherein:

Figure 1 is a plan view of an oven arranged in accordance with a preferred form of my invention, parts being broken away and the sand being omitted from above the baking compartment; Fig. 2 is a section taken on line 2—2 of Fig. 1; Fig. 3 is a section taken on line 3—3 of Fig. 1; Figs. 4 and 5 are perspective views of the end supports for the bottom of the baking compartment; Fig. 6 is a perspective view showing a fragment of one of the uprights and one of the upper transverse bars for supporting the baking compartment; and Figs. 7 and 8 are respectively a side elevation and a section of a fragment showing the connection between the uprights and the bars for uniting them and spacing them apart.

Referring to the drawings, A represents a series of grooved uprights, these being in the form of I beams; B represents grooved corner posts of any suitable construction. The uprights, including the corner posts, are grouped at equal distances apart so as to form a rectangular shell. The uprights are held together in this condition in any suitable way, preferably by means of strips C and D extending across the uprights at the tops and bottoms thereof on the long sides of the shell, and similar strips $C^1$ and $D^1$ arranged on the short sides of the shell. It will be seen that when the parts heretofore described are assembled, they form a rectangular open framework. The strips are preferably secured to the uprights so as to permit a limited movement between the uprights in the direction of the length of the strips. This may conveniently be accomplished in the manner shown in Figs. 7 and 8, namely, by providing the strips with elongated openings E and the uprights with bolts F which project through these openings.

When the framework has been assembled, the space between each pair of uprights is filled with tiles G, these tiles being inserted from the top of the shell with their ends projecting into the grooves in the sides of the uprights. These tiles are preferably made to interlock at their meeting edges as indicated at $g$. Since the uprights are spaced at uniform distances apart, the tiles for completing the shell are interchangeable, so that no particular care need be exercised in order to get the right tile in the right place. The pin and slot connections between the uprights and the binding strips permit the uprights to be spaced apart initially far enough to let the tiles drop in place freely. After all the tiles have been placed in position, the opposite sides of the shell are drawn toward each other, thereby shortening each of the sides by drawing the uprights firmly against the ends of the tiles. This may conveniently be accomplished by means of tie rods H and $H^1$, the tie rods H extending through the strips $C^1$ and $D^1$ at opposite ends of the oven and the tie rods $H^1$ extending through the strips C and D on the sides of the oven. We have now a large rectangular casing open at the top and at the bottom and supported from the floor or other surface upon which the oven is to be built. Certain of the uprights are provided with inwardly projecting shoulders I and $I^1$, the shoulders I all lying in a horizontal plane at a considerable distance above the supporting surface and the lugs $I^1$ lying in the second horizontal plane somewhat above the plane of the other lugs.

J, $J^1$ and $J^2$ are transverse bars or beams supported upon the lugs or shoulders I and, if desired, having downwardly-projecting legs $j$ which rest upon the surface which supports the oven. Resting upon the bars J, $J^1$ and $J^2$ are tiles K which serve to form a smooth floor or bottom of the baking compartment. It is necessary to leave a space between the sides and ends of the baking compartment and the interior of the surrounding shell. It may not always be desirable to leave a space between the ends of the baking compartment and shell equal to the length of one of the tiles G and therefore special end supports are required for the tiles $K^1$ at the ends of the baking compartment. In Figs. 4 and 5, I have illustrated a convenient form of end support, $J^1$ and $J^3$ representing a combined transverse bar and end support at the rear end, and $J^2$ and $J^4$ a combined transverse bar and end support for the front end. The tiles $K^1$ rest between and upon the members $J^1$ and $J^3$ and the members $J^2$ and $J^4$. The bars are provided with upwardly projecting lugs $j^1$ which are adapted to engage with the sides of the upright tiles $K^2$ which form the side walls of the baking compartment and prevent these tiles from being displaced outwardly. The tiles K and $K^1$ are preferably interlocked as indicated at $k$ and the tiles $K^2$ are preferably interlocked with the tiles K as indicated at $k^1$.

Supported upon the lugs $I^1$ are a series of transverse bars L upon which are supported the tiles $K^3$ which form the top of the baking compartment. The short end tiles $K^4$ are supported at their one end upon the extreme bars L and at their other end upon the tops of the tiles $K^2$ at the ends of the compartment. The tiles $K^3$ and $K^4$ are preferably interlocked as indicated at $k^2$. If desired, the bars L may be provided with lugs $l$ so situated that short angle bars M may be dropped over the top corners of the compartment so as to overlie the meeting edges of the tiles $K^2$ and $K^3$ and be held against lateral displacement by the lugs. At the rear of the baking compartment there may be a U-shaped angle iron $M^1$ which overlies the side and end edges of the short tiles $K^4$. the lugs $l^1$ on the two end bars are preferably made hook-shaped, as indicated, so that they may be interlocked with the shoulders $m^1$ on the angle irons and prevent the angle irons from being moved endwise.

It will be seen that when the baking compartment is assembled in the manner described a tight box-like structure is produced and, if desired, the tightness of the joints between the tiles may be increased by cementing them together.

The oven shown is intended to be heated internally and intermittently. The furnace N is placed in one corner and its front wall $N^1$ takes the place of three of the tiles G between one of the end posts and one of the uprights.

The furnace is preferably self-supporting and rests upon the supporting surface for the oven. However, in order to avoid complications, a horizontal flange $N^2$ is provided at such a height that it will rest upon the bar $J^2$ and the shape of this flange is made such that it, together with the remainder of the furnace, will take the place of one of the tiles $K^1$ in the bottom wall of the oven. The height of the furnace is made such that the furnace also replaces one of the tiles $K^4$ in the top wall of the baking compartment. Furthermore, the width of the furnace may be such that a complete end tile may be removed without disarranging the rest of the structure. The grate $N^3$ is preferably arranged at a considerable distance below the floor of the baking compartment so that there will be little danger of coal or ashes entering the baking compartment. The furnace connects directly with the baking compartment through an opening $N^4$, but this opening may be closed by means of a sliding door N⁵ of fire brick or the like. In the arrangement shown this door is adapted to slide within a tubular guide N⁶ and the door is adapted to be raised and lowered by means of a rod N⁷ projecting through this guide. One of the tiles K² near the corner farthest removed from the furnace is replaced by a casting O having a flue o leading therefrom. This flue is connected with a chimney o¹. It will be seen that when there is a fire in the furnace and the door N⁵ is open, the products of combustion will pass through the opening N⁴ into the baking compartment and thence through the flue o to the chimney o¹. From the top of the furnace leads a second flue P which may conveniently be made of tiling lying upon the top wall of the baking compartment. This flue is connected by means of a pipe p with a chimney o¹. It will be seen that when the door N⁵ is closed, the products of combustion will pass from the furnace through the flue P and thence to the chimney. Q and Q¹ represent dampers or cut-offs in the flue o and the pipe p, respectively. When a fire is started, the door N⁵ is closed and the cut-off Q¹ opened; consequently the products of combustion will reach the chimney without passing through the baking compartment. When the coals have become red and all of the volatile matter is being consumed, the cut-off Q¹ is closed and the door N⁵ opened; the cut-off Q being also open, the hot gases from the furnace pass through the baking compartment and thence through the flue o to the chimney. The oven now becomes heated in the usual way, but without danger that there will be a deposit of soot or tarry matter which will soil the interior of the baking compartment. If it is necessary to put in a new charge of coal so as to give rise to more unconsumed volatile matter, the cut-off Q¹ can then be opened and the door N⁵ be closed until such a time when the combustion gases may be admitted into the baking compartment without carrying with them unconsumed matter which may settle upon the walls thereof. It will also be seen that at any time, even while baking is going on, a fire may be started without carrying objectionable matter into the baking compartment. The depth of the baking compartment is, of course, small as compared with the depth of the surrounding shell and therefore a great heat-retaining body of sand R wholly surrounding the baking compartment and extending to the floor may be provided.

At the front of the oven there is a tunnel S through which the materials to be baked are introduced into the baking compartment. This tunnel is preferably so proportioned that it replaces one of the tiles G in the front of the shell and, if it then takes up more room than one of the tiles K², a special tile K⁶ may be inserted between the tunnel and the oven. T represents a second and smaller tunnel leading to one corner of the baking compartment and adapted to permit the introduction of a light into the baking compartment for the purpose of inspection.

It will now be seen that I have provided an oven which may be shipped and completely assembled without the use of any materials which are not supplied from the factory except, perhaps, a small amount of cement to make tight joints; and, since this cement can, where desired, be applied by even an unskilled person, the entire oven may be set up without the aid of skilled mechanics, if they do not happen to be at hand. Furthermore, the oven may be dismantled and again set up with the assurance that in its new position it will be just as effective and efficient as before. Furthermore, by reason of the peculiar heating arrangement, the objectionable feature in other internally heated ovens is entirely overcome and, in fact, heat may be supplied to the oven at any time as conveniently and effectively as in the continuously heated ovens. Furthermore, by reason of the peculiar situation which permits the entire space beneath the baking compartment to be filled with sand, a much more efficient oven is obtained than has heretofore been possible.

While I have described in great detail a preferred embodiment of my invention, I do not desire to be limited to the exact structural details shown, but intend to cover all forms falling within the terms of the definitions of my invention constituting the appended claims.

Having now fully described my invention, what I claim as new and desire to secure by Letters Patent is:

1. In a baker's oven, a series of grooved uprights, means for tying said uprights together so as to form a skeleton shell, and matched tiles filling the space between each pair of consecutive uprights and extending into the grooves in the uprights, said tying means being constructed and arranged to permit the said shell to be contracted so as to clamp the tiles firmly between said uprights.

2. In a baker's oven, a series of grooved uprights, arranged so as to form the four sides of a shell, matched tiles extending from one upright to another and projecting at their ends into the grooves in the uprights, means for tying the uprights on each side of said shell together, and means for drawing opposite sides of said shell toward each other.

3. A skeleton framework for a baker's oven comprising a series of grooved uprights arranged so as to form the four sides of the shell, strips extending transversely of the uprights upon each side of the shell, connections between said strips and said uprights permitting limited relative movement between the uprights and the strips lengthwise of the strips, and adjustable tie members extending from each side of the shell to the opposite side.

4. In a baker's oven, a series of grooved uprights, means for tying said uprights into the form of a skeleton shell, tiles extending from one upright to another and projecting at their ends into the grooves therein, inwardly-projecting shoulders on certain of said uprights, bars extending transversely of said shell and resting upon said shoulders, and a baking compartment formed of tiles built upon said bars.

5. In a baker's oven, a series of grooved uprights, means for tying said uprights into the form of a skeleton shell, tiles extending from one upright to another and projecting at their ends into the grooves therein, a set of inwardly-projecting shoulders on certain of said uprights, a second set of shoulders on certain of said uprights above said first set of shoulders, two sets of bars extending transversely of said shell and resting upon said two sets of shoulders, and tiles extending between and resting upon the bars of each set to form the top and bottom of a baking compartment.

6. In a baker's oven, a series of grooved vertical uprights grouped into the form of a skeleton shell, tiles filling the spaces between each pair of adjacent uprights and extending into the grooves therein, and adjustable connecting means for said uprights constructed and arranged to draw them together into close engagement with the ends of the tiles and lock them against displacement.

7. In a baker's oven, a series of uprights having vertical grooves on the sides thereof, said uprights being grouped so as to form a skeleton shell, tiles filling the space between each pair of adjacent uprights and extending into said grooves, and means for drawing said uprights toward each other so as to decrease the size of said shell by forcing the uprights against the ends of said tiles, the parts being so proportioned and arranged that the tiles are prevented from being displaced laterally by the portion of the uprights bounding the grooves.

8. In a baker's oven, a series of longitudinally grooved uprights arranged in the form of a rectangular skeleton shell, tying devices for connecting said uprights together said tying devices being so constructed and arranged as to permit the uprights on any side of the shell to be drawn toward each other so as to shorten that side of the shell and to permit each side of the shell to be drawn toward the opposite side, and tiles arranged between the uprights and fitting into the grooves therein, the tiles being so proportioned that a single tile spans the space between two adjacent uprights.

9. In a baker's oven, a series of longitudinally grooved uprights arranged in the form of a rectangular skeleton shell, tying devices for connecting said uprights together, said tying devices being so constructed and arranged as to permit the uprights on any side of the shell to be drawn toward each other so as to shorten that side of the shell and to permit each side of the shell to be drawn toward the opposite side, and tiles arranged between the uprights and fitting into the grooves therein, the tiles being so proportioned that a single tile spans the space between the two adjacent uprights, the tiles between each pair of uprights having interlocking joints.

In testimony whereof I sign this specification in the presence of two witnesses.

CLARENCE E. SEARS.

Witnesses:
W. A. BOWERS,
D. E. STONER.